US008793602B2

(12) United States Patent
Szpak et al.

(10) Patent No.: US 8,793,602 B2
(45) Date of Patent: Jul. 29, 2014

(54) SYSTEM AND METHOD FOR SCHEDULING THE EXECUTION OF MODEL COMPONENTS USING MODEL EVENTS

(75) Inventors: Peter Szpak, Newton, MA (US); Matthew Englehart, Olmstead Falls, OH (US)

(73) Assignee: The MathWorks, Inc., Natick, MA (US)

(*) Notice: Subject to any disclaimer, the term of this patent is extended or adjusted under 35 U.S.C. 154(b) by 2175 days.

(21) Appl. No.: 10/759,346

(22) Filed: Jan. 15, 2004

(65) Prior Publication Data

US 2005/0160397 A1   Jul. 21, 2005

(51) Int. Cl.
*G06F 3/048* (2013.01)

(52) U.S. Cl.
USPC ............ 715/764; 715/735; 717/104; 345/173

(58) Field of Classification Search
USPC .............. 715/853, 771, 764, 964, 735; 716/4; 345/173; 717/104
See application file for complete search history.

(56) References Cited

U.S. PATENT DOCUMENTS

| | | | |
|---|---|---|---|
| 4,827,404 A | 5/1989 | Barstow et al. | |
| 5,363,320 A | 11/1994 | Boyle et al. | |
| 5,497,500 A | 3/1996 | Rogers et al. | |
| 5,522,073 A * | 5/1996 | Courant et al. | 719/313 |
| 6,820,042 B1 | 11/2004 | Cohen et al. | |
| 6,880,130 B2 * | 4/2005 | Makowski et al. | 715/763 |
| 7,047,176 B2 | 5/2006 | Klevans et al. | |
| 7,134,109 B2 * | 11/2006 | Hayles | 716/6 |
| 7,139,692 B2 | 11/2006 | Cohen et al. | |
| 7,809,545 B2 | 10/2010 | Ciolfi et al. | |
| 2003/0058280 A1 | 3/2003 | Molinari et al. | |
| 2004/0260700 A1 * | 12/2004 | Wang et al. | 707/10 |
| 2005/0055666 A1 * | 3/2005 | Kornerup et al. | 717/105 |

FOREIGN PATENT DOCUMENTS

| | | |
|---|---|---|
| EP | 0 870 545 | 9/1995 |
| JP | 2001-075619 A | 3/2001 |
| JP | 2003-241965 A | 8/2003 |
| WO | WO 99/46889 | 9/1999 |
| WO | WO 01/67192 | 9/2001 |
| WO | WO-2004/095267 A2 | 11/2004 |

OTHER PUBLICATIONS

De Niz, Dionisio, et al., "Geodesic-A Reusable Component Framework for Embedded Real-time Systems," Sep. 2002, pp. 1-20.

(Continued)

*Primary Examiner* — Linh K Pham
(74) *Attorney, Agent, or Firm* — Cesari and McKenna, LLP; Michael R. Reinemann

(57) ABSTRACT

A method of specifying and configuring a causal relationship between the dynamics of a graphical model and the execution of components of the model is disclosed. Model component execution is tied to the occurrence of model events. Model events are first defined in the modeling environment. The occurrence of conditions in the model specified in the definition of the event causes the event to be "posted". Model components that have been associated with the occurrence of the event "receive" the notice of the posting of the event and then execute. Random components within a subsystem may be designated to execute upon the occurrence of an event, as may non-contiguous components within a model. The association between model events and component execution may be specified without drawing graphical indicators connecting components in the view of the model.

75 Claims, 15 Drawing Sheets

(56) References Cited

OTHER PUBLICATIONS

Deng, William, et al., "Model-checking Middleware-based Event-driven Real-time Embedded Software," Nov. 2002, pp. 1-26.
"English Abstract of Japanese Publication No. JP-2001-075619," published on Mar. 23, 2001, one page.
"English Abstract of Japanese Publication No. JP-2003-241965," published on Aug. 29, 2003, one page.
English Translation of "Decision of Refusal" from Japanese Patent Office in Application No. 2006-549406, dated Feb. 7, 2011, (actual date of Decision is Feb. 7, 2012), pp. 1-10.
English Translation of "Official Questioning" from Japanese Patent Office in Application No. 2006-549406, dated Nov. 20, 2012, pp. 1-6.
English Translation of "Notification of Reasons for Refusal" from Japanese Patent Office in Application No. 2006-549406, dated May 24, 2011, pp. 1-6.
English Translation of "Notification of Reasons for Refusal" from Japanese Patent Office in Application No. 2006-549406, dated Jan. 14, 2014, pp. 1-59.
Ishizuka, Shinichi, "MATLAB Family: Design Capability Compatible with Sophisticated Control Theory," Interface, CQ Publishing Co., Ltd., Sep. 1, 1997, vol. 23, No. 9, pp. 84-85.
Jamal, Rahman, et al., "Zeitkritische Regelungen unter LabVIEW," Elektronic, Sep. 2001, pp. 86-93.
Klinger, Motti, "Reusable Test Executive and Test Programs Methodology and Implementation Comparison Between HP VEE and LabVIEW," IEEE, Aug. 1999, pp. 305-312.
"Matlab," Journal of the Society of Instrument and Control Engineers, Jan. 10, 1999, vol. 38, Issue 1, pp. 80-81.
"Notification of Transmittal of the International Search Report and the Written Opinion of the International Searching Authority, or the Declaration," International Filing Date: Apr. 16, 2004, International Application No. PCT/US2004/011839, Applicant: The MathWorks, Inc., Date of Mailing: Jul. 12, 2005, pp. 1-5.
"SIMULINK™: Model-Based and System-Based Design, Using Simulink," Version 4, The MathWorks, Inc., Apr. 2003, pp. 1-838.
"SIMULINK™: Model-Based and System-Based Design, Using Simulink," Version 5, Chapter 2, The MathWorks, Inc., Jul. 2002, pp. 1-50.
"SIMULINK™: Model-Based and System-Based Design, Using Simulink," Version 5, The MathWorks, Inc., Jul. 2002, pp. 1-476.
Takaya, Kunio, "Comprehensive Application of Matlab," Morikita Publishing Co., Ltd., Feb. 22, 2002, First Edition, pp. 117-122.
"Tool for Modeling/Simulating Dynamic Models: Basics of Simulink," Interface, CQ Publishing Co., Ltd., Oct. 1, 2001, Issue 27, No. 10, pp. 28-52.

* cited by examiner

SYSTEM AND METHOD FOR SCHEDULING THE EXECUTION OF MODEL COMPONENTS USING MODEL EVENTS

RELATED APPLICATION

The illustrative embodiment of the present invention is related to a presently U.S. patent application entitled, "*A System and Method for Using Execution Contexts in Block Diagram Modeling*", Ser. No. 10/414,644, now U.S. Pat. No. 7,809,545, the contents of which are hereby incorporated by reference.

FIELD OF THE INVENTION

The illustrative embodiment of the present invention relates generally to the execution of model components within a modeling environment, and more specifically to the scheduling of the execution of modeling components using model events.

BACKGROUND

Simulink™ from The MathWorks, Inc. of Natick, Mass., is an example of a graphical modeling environment, specifically a block diagram environment. Simulink™ allows users to create a pictorial model of a dynamic system. The model consists of a set of symbols, called blocks. Each block can have zero or more input ports, output ports, and states. Each block represents a dynamic system whose inputs, states, and outputs can change continuously and/or discretely at specific points in time. The lines are used to connect the blocks' ports to one another, and represent data dependencies between blocks. Signals may be represented as values traveling along the lines that connect the blocks in a block diagram.

If all of a block's inputs, states, and outputs change either continuously or at one fixed, periodic rate, the block is considered to be a 'single-rate' block. If the inputs, states, and outputs update, either together, or separately at points in time defined by two or more rates, the block is considered to be a 'multi-rate' block. If a model has multi-rate blocks in it, or two or more single-rate blocks running at different rates, then the model itself is multi-rate (vs. single-rate).

A block is referred to as 'atomic' if its functional definition is outside the context of the model in which it is placed. Simulink™ has a set of predefined atomic blocks (e.g. Sum, Product, Gain), and the user can also create their own atomic blocks through user-written 'S-functions'. Being atomic, S-functions' functional definitions are specified outside the context of the model, for example using C code or MATLAB 'm' code. A 'composite' block is a block whose functional definition is specified through the model, using sets of atomic and composite blocks. Simulink™ permits the user to specify 'subsystems', composite blocks whose definition consists of interconnected sets of predefined blocks, user-written S-functions, and other Simulink™ subsystems. Subsystems can be nested hierarchically, defining a 'model hierarchy.'

Simulink™ sample rates provide a mechanism for specifying how often components of a model execute. FIG. 1 depicts an example of the use of sample rates in controlling the execution of model components. For example, the designer may specify that a plant block 4 executes at a continuous rate, and a controller block 10 executes at some periodic, discrete rate. The execution of model components is scheduled by the Simulink™ infrastructure when simulating, or by the operating system for a real-time implementation. There is no causal relationship between the dynamics of the model and the scheduling of these rates; the instants at which the components execute are predetermined.

Simulink™ supports the propagation of sample rates. For example, the rates of the Gain blocks 8 and 12 in FIG. 1 may have been left unspecified, or rather, specified as "Inherit". In this case, assuming that the rates of the plant 4 and controller 10 blocks have been specified, the Gain blocks 8 and 12 inherit their rates from the plant and controller blocks.

Simulink™ also provides mechanisms for specifying causal relationships between the dynamics of the model and the execution of model components, including: function-call subsystems, triggered subsystems, iterator subsystems, action subsystems and enabled subsystems. The specifying of causal relationships permits users to specify execution of model components conditional on present and past values of signals and other data in the model.

However, the scope of conditional execution is generally restricted to a subsystem as conventional methods of specifying the relationships do not allow the scope of conditional execution to be defined as an arbitrary set of blocks (as opposed to the set of blocks that comprise a subsystem). This is a significant limitation, since there are times where it is desirable to simultaneously execute a set of blocks that are not in a subsystem and/or are not contiguous in the model. For example, conventional methods of conditional execution do not allow execution of various blocks distributed throughout the model at power-up or power-down. As a result, the manner in which the causal relationships may be composed is restricted. Conventional methods of specifying the causal relationships between the dynamics of a model and the execution of model components do not allow a user to enable half of the blocks in a subsystem and trigger the other blocks. Similarly, one may not trigger some of the blocks in a subsystem with one trigger, and the remaining blocks with a different trigger.

An additional drawback to conventional mechanisms for specifying the causal relationships between the dynamics of a model and the execution of model components is that these mechanisms require graphical connections to be made in the block diagram to indicate causality. This can result in an appearance which some users feel "clutters" the diagram. Another limitation to conventional mechanisms for specifying causal relationships is that the conventional mechanisms do not naturally map to advanced software or operating system constructs, such as initialization, exceptions, or tasks. Similarly, since conventional mechanisms of specifying the causal relationships lack a first class object associated with the causal relationship, it is difficult to configure and assign characteristics to that relationship. It is also difficult for the user to directly leverage implicit dynamics associated with the mechanisms, for example the enable and disable methods associated with an enabled subsystem, and to conditionally execute components of the model based on these implicit dynamics.

BRIEF SUMMARY

The illustrative embodiment of the present invention provides a mechanism for specifying and configuring a causal relationship between the dynamics of a model and the execution of components of the model. Model component execution is tied to the occurrence of "model events". Model events are first defined in the modeling environment. The occurrence of conditions in the model specified in the definition of the event causes the event to be "posted". Model components that have been associated with the occurrence of the event "receive" the notice of the posting of the event and then execute. Isolated components within a subsystem may be designated to execute upon the occurrence of an event, as may non-contiguous components within a model. The association between model events and component execution may be specified without drawing graphical indicators connecting components in the view of the model.

In one embodiment, in a modeling environment having at least one model with multiple executable components, a method monitors the execution of the model for the occurrence of a specified event. Upon determining the occurrence of the specified event, the occurrence of the event is posted to an event handler. A component is then executed in response to the notifying of the event handler.

In another embodiment, in a modeling environment having at least one model with multiple executable components, a method monitors the execution of the model for the occurrence of a specified event. Upon determining the occurrence of the specified event, the execution of another event is interrupted in response to the determination of the occurrence of the specified event. An operation in the model is then performed in response to the determination of the occurrence of the specified event.

In an embodiment, in a modeling environment, a system includes a graphical model with multiple executable components. The system also includes an event handler. The event handler receives notice from the model of the occurrence of a specified event. The system additionally includes at least one component which receives notification from the event handler of the occurrence of the specified event. The receiving component executes in response to the notification.

DETAILED DESCRIPTION

The illustrative embodiment of the present invention provides a mechanism for tying the execution of model components to the occurrence of specified model events. Sample rates are specified as events thus tying model component execution to the dynamics of the model. Non-contiguous model elements may be configured to conditionally execute based on model event occurrence. Additionally, the scope of component execution is not limited to subsystems in their entirety as is required by certain conventional systems. The conditional execution of components based on event occurrence may also be used for exception handling. Associations between model components and events may be established without drawing additional component connections in the view of the model.

For sake of clarity, the explanation of the illustrative embodiment of the present invention contained herein makes reference to a Simulink™ and MATLAB™-based modeling environment (both applications from The MathWorks of Natick, Mass.) However, it should be recognized by those skilled in the art, that the illustrative embodiment of the present invention may also be applied to other modeling environments and other types of diagrams in addition to traditional block diagrams including Stateflow™ from the MathWorks of Natick, Mass., a state diagramming application, and data flow diagramming environments.

A Simulink™ Model Event as used in the illustrative embodiment of the present invention (also referred to hereafter as "Event" or "Simulink™ Event") may be explicitly defined in a MATLAB workspace as an object. Its attributes may include a name, a color, an optional expected rate, an optional task, and an explanation as to how the function corresponding to the event should be implemented (e.g. inline vs. explicitly defined signature).

Events that have been defined may be "posted" by blocks in the model, based on arbitrary conditions the user defines. Blocks that "receive" that event execute when it is posted. "Posting" refers to sending a message to an event handler indicating the occurrence of a particular event. Blocks that have registered with or otherwise hooked into the event handler are then informed about the occurrence of the event when the event posts.

Figure 1:
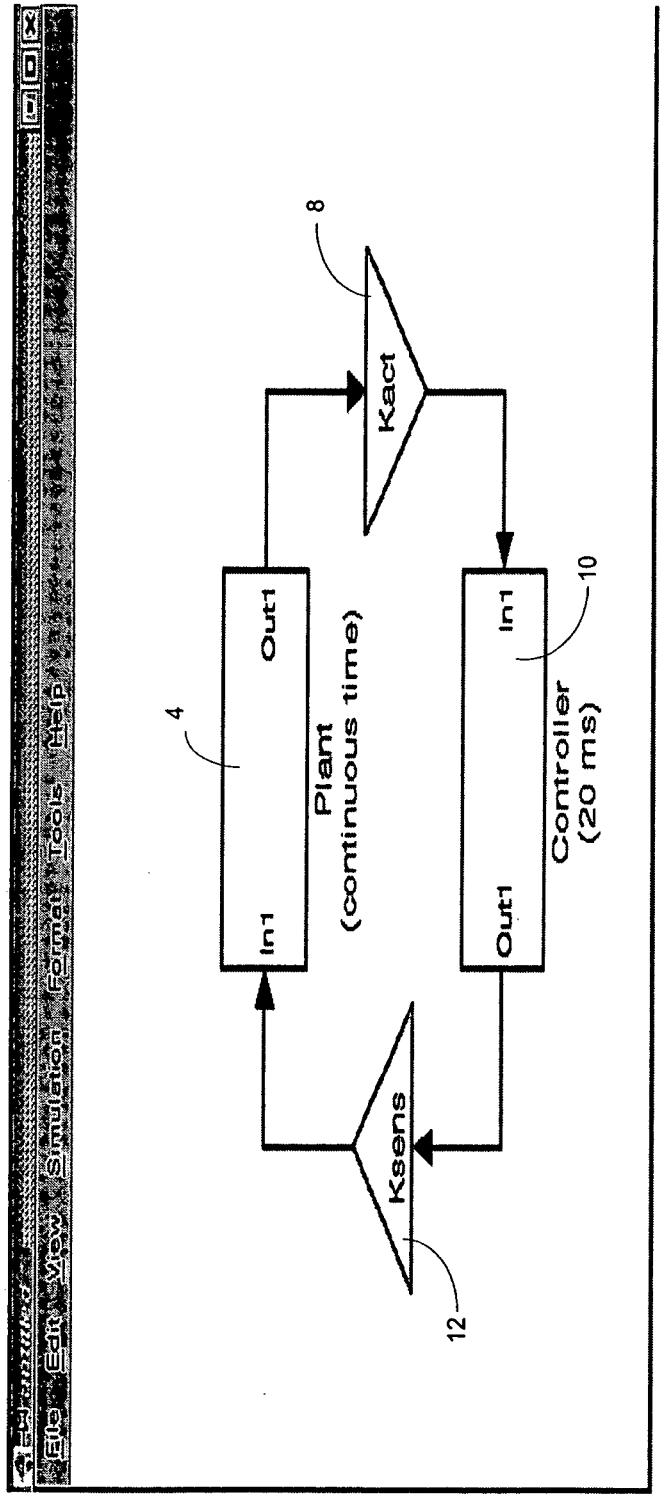
FIG. 1 depicts a conventional block diagram model utilizing sample rates.
Figure 2:
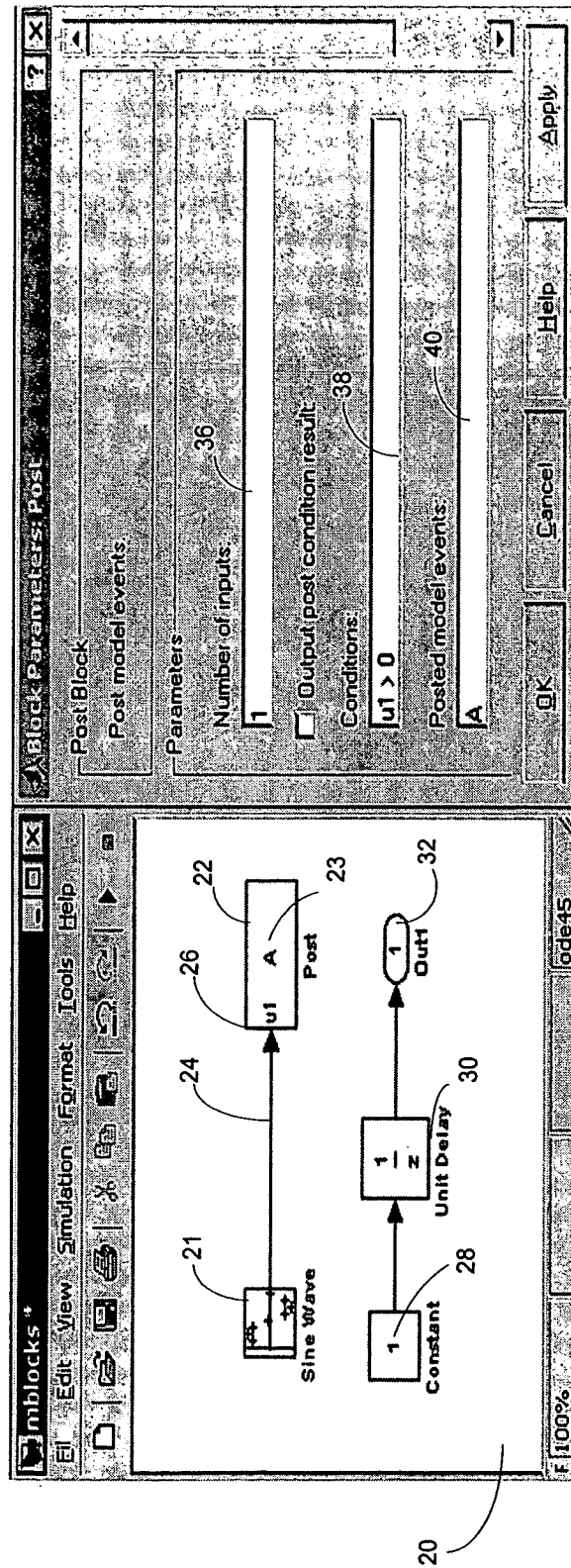
FIG. 2 depicts a model utilizing the posting process of the illustrative embodiment of the present invention.

FIG. 2 depicts an example of a model 20 utilizing the posting process. The event "A" has been defined and given the attribute of the color "blue". In the model 20 the block "Post" 22 has been configured (as seen by the dialog in that figure) to post the event "A" conditionally when the signal 24 at its input port 26 is greater than zero. The dialog box solicits a number of parameters from the user for the post block 22 including the number of inputs 36, the condition 38 under which the block executes, and the name assigned to the defined model event 40. The view of the model 20 indicates that the sample rate of the block "Constant" 28 has been specified to be event "A". That sample rate (i.e.: the occurrence of the event "A") is propagated to the blocks "Unit Delay" 30 and "Out1" 32 which have been set to inherit their sample rates. All three blocks thus receive event "A". All three blocks 28, 30 and 32 may assume the "color" of the Event "A" and be shaded blue in a display to a user as a way of expressing the logical association. Therefore, when the output of "Sine Wave" block 21 is positive, "A" is posted by the block "Post", the three blocks 28, 30 and 32 execute, and the value at the model's root outport is updated.

The model depicted in FIG. 2 shows the resolution of some of the issues associated with conditional execution of subsystems that are provided by the illustrative embodiment of the present invention. There is a first class object "A" associated with the causal relationship, so that it is possible to configure and assign characteristics to that relationship, such as color. The scope of conditional execution is not restricted to a subsystem. The three blocks 28, 30 and 32 that are conditionally executed are not grouped within a parent subsystem and may be chosen from non-contiguous areas of the model 20. Additionally, the scope of conditional execution employs rate propagation (only the block "Constant" 28 specifies "A" as its sample rate). This results in a method of specifying sample rates that is more concise than would otherwise be the case if every block receiving "A" had to have its sample rate explicitly specified as "A". Also, the association of blocks with an event does not require a graphical connection between the post block 22 and the constant block 28 to be made in the diagram to indicate causality. The causal relationship between the condition specified by the "Post" block 22 and the execution of the three blocks 28, 30 and 32 is through their common reference to the Event object named "A" 23.

An event's "scope" is the scope of the workspace within which it exists. If a workspace is associated with a subsystem or model, the scope of the event is that subsystem or model. Blocks may only specify their sample time as an event when that event is in scope from that block.

Figure 3:
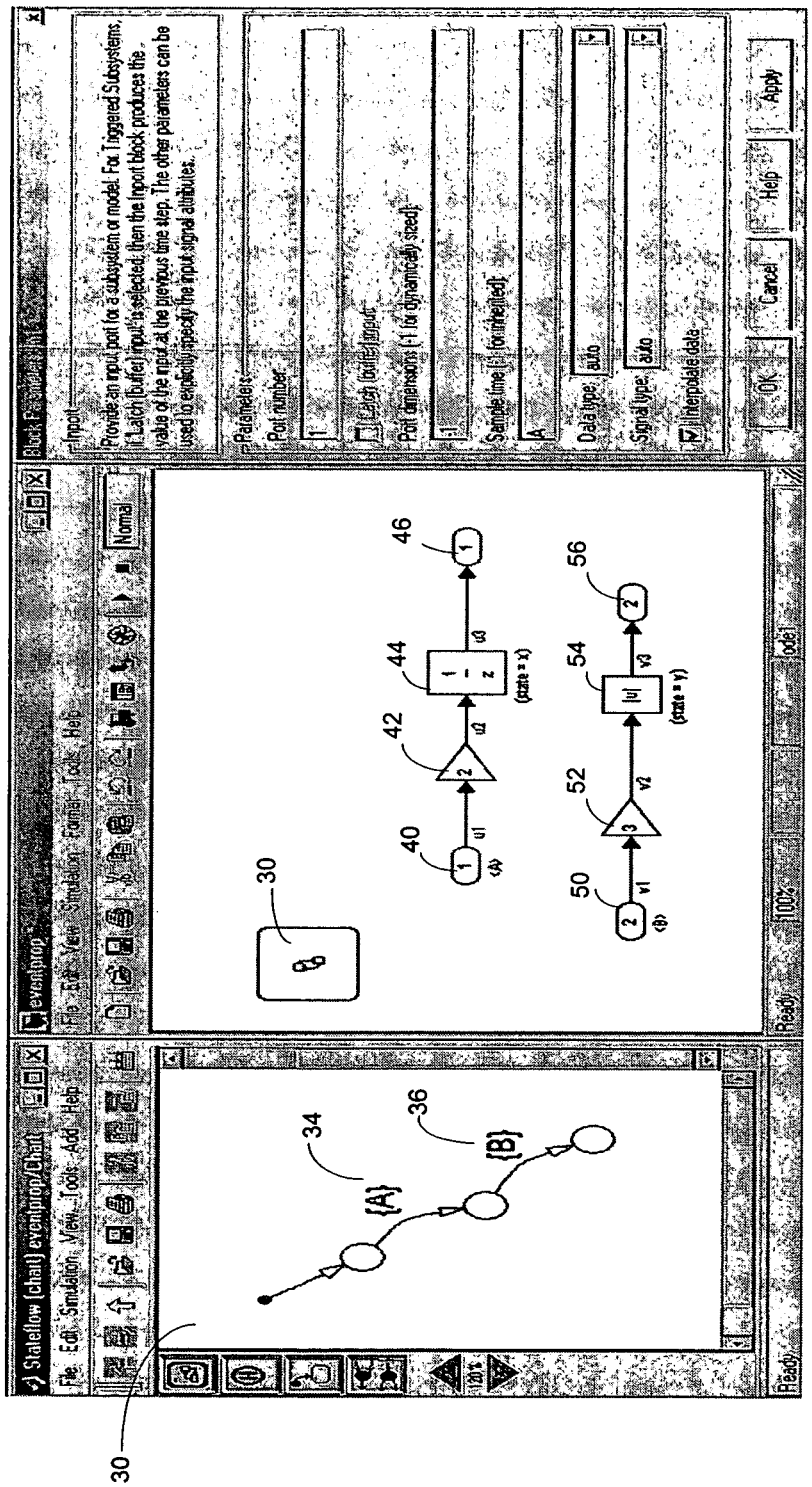
FIG. 3 depicts the posting and receiving of events in a Stateflow™ environment in accordance with the illustrative embodiment of the present invention.

FIG. 3 depicts another example of an environment in which the explicit posting and receiving of events occurs, displaying a Stateflow™ chart 30 and a block diagram model 32 of the components of the chart in more detail. In this example, the user defines events "A" 34 and "B" 36, with the attribute colors green and blue, respectively. Both events 34 and 36 have their sample rates specified as 20 ms. The Stateflow chart 30, then executes every 20 ms and posts these events in a well-defined, periodic sequence. The two input port blocks 40 and 50 have their sample rates set to the events "A" 34 and "B" 36. The remainder of the blocks take on those events as inherited sample rates and are shaded to the color corresponding to the event. The set of blocks colored green 40, 42, 44 and 46 receive the event "A" and execute when that event is posted. Likewise, the set of blocks colored blue 50, 52, 54 and 56 execute when event "B" is posted.

The set of blocks handling each event execute in the relative order that they appear in the model's sorted block list. The sorted block list order is determined by data dependencies. Accordingly, every 20 ms the Stateflow chart 30 executes, and the chain of green blocks 40, 42, 44, and 46 executes, left to right, followed by the chain of blue blocks 50, 52, 54 and 56, left to right. Furthermore, since the optional sample rate of the events has been explicitly specified to be 20 ms, a runtime check is performed to assert that those events are posted every 20 ms. One advantage of explicitly specifying an event's rate is that any code generated for that rate can use the corresponding constant sample time in the generated code wherever elapsed time between successive execution is required, rather than requiring the usage of timers, as would ordinarily be the case.

In contrast to explicit events, which are defined as workspace objects and whose conditions for posting are explicitly specified by the user (e.g. through the usage of Simulink™ "Post" blocks or Stateflow logic), implicit events are implied by model constructs, and automatically posted in response to execution of those constructs. The user cannot post implicit events. However, the user can handle implicit events, meaning that the user can define model components that execute directly in response to an implicit event.

The illustrative embodiment of the present invention includes the five types of implicit events noted in the table below:

| Name of Event | Type of Event | Scope | Location where posted | When posted |
|---|---|---|---|---|
| $t_s$ | Startup | Entire model | Root of model | Beginning of model execution |
| $t_0$ | Initialize | Enable/If/Case subsystem | Top level of subsystem | The first time the subsystem transitions from inactive to active |
| $t_e$ | Enable | Enable/If/Case subsystem | Top level of subsystem | Whenever the subsystem transitions from inactive to active |
| $t_d$ | Disable | Enable/If/Case subsystem | Top level of subsystem | Whenever the subsystem transitions from active to inactive |
| $t_f$ | Shutdown | Entire model | Root of model | End of model execution |

Those skilled in the art will recognize that other types of implicit events may be handled in addition to those listed in the table above without departing the scope of the present invention. For example, other types of implicit events that may be supported include error conditions, such as an implicit event posted when a product block attempts to divide by zero, or a logarithm block attempts to take the logarithm of zero. Objects corresponding to implicit events automatically populate the various workspaces of the model, whereby their properties may be configured by the user.

Figure 4:
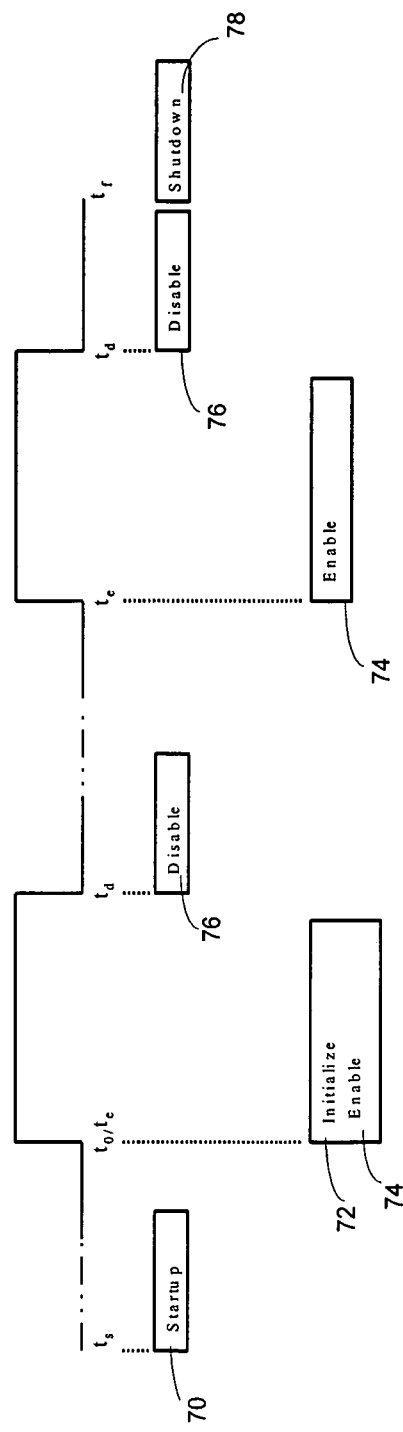
FIG. 4 is a timing diagram of implicit events occurring in an enabled subsystem.

FIG. 4 depicts the implicit events noted in the table above in a timing diagram. FIG. 4 shows the relative timing of the events that are in scope in an enabled subsystem or its descendents in the function-call hierarchy; the time varying signal is the signal enabling the subsystem. All five types of implicit events have an asynchronous sample rate. The implicit events include startup 70, initializing 72, enabling 74, disabling 76 and shutdown 78.

Figure 5:
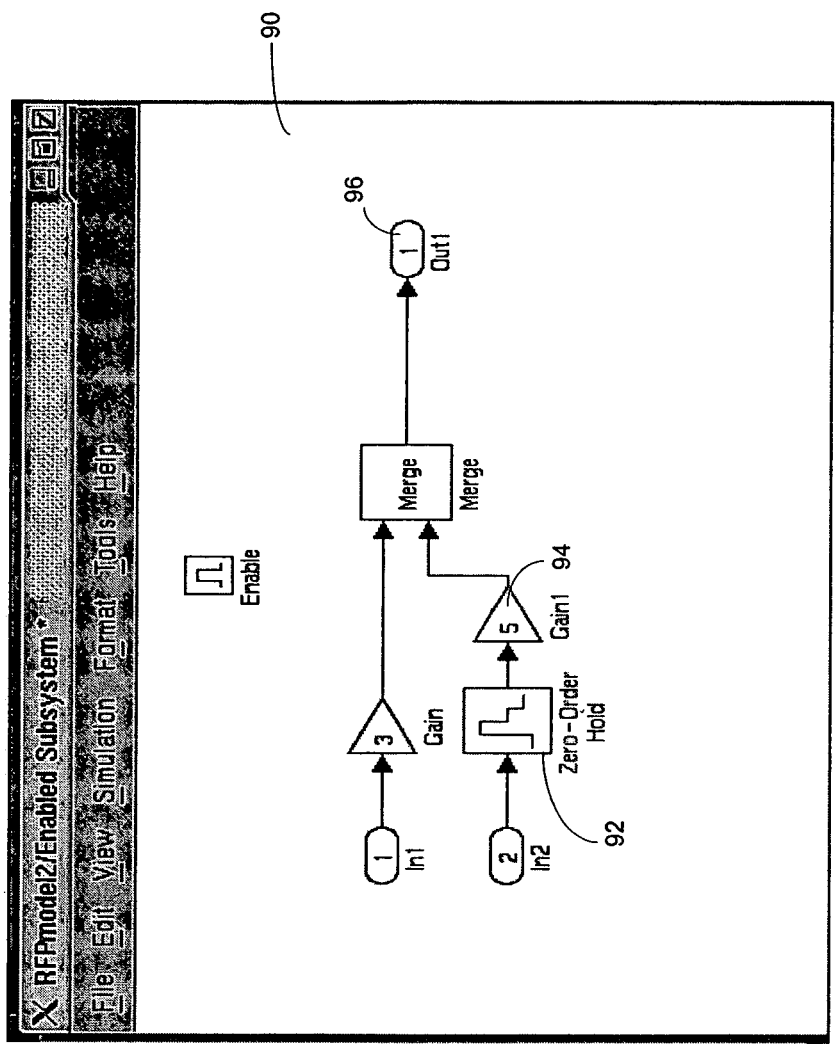
FIG. 5 depicts a model using implicit events in an enabled subsystem.

An example of the use of implicit events in an enabled subsystem 90 is shown in FIG. 5. The subsystem 90 has implicit enable and disable events associated with it, that are posted when the subsystem enables and disables. The block "Zero-Order Hold" 92 has its sample rate specified as "Disable", so that it executes when the implicit disable event executes, i.e. when the enabled subsystem 90 disables. Through propagation, the block "Gain1" 94 also inherits that event (disable) as its sample rate, and together, these two blocks execute and update the memory associated with the subsystem output port 96 when the subsystem 90 disables.

Each event in the illustrative embodiment of the present invention maps 1-1 to a function (also referred to herein as the "event handler") that serves as the entry point to the code corresponding to the blocks whose sample rate has been specified or inherited as the event. Whenever the conditions leading to the posting of the event are true, the system reacts by calling the function. The function may be inlined during code generation. The choice of whether or not to inline an event's function is a property of the corresponding event object. As a default implementation, a user may choose to inline implicit events' functions, and not to inline explicit events' functions.

One of the properties of a Simulink™ Event is its task. By default, an event inherits its task from the context from which it is posted. For example, in FIG. 3 the events "A" 34 and "B" 36 execute in the same task as the Stateflow chart 30 posting those events. The generated code calls the functions corresponding to "A" and "B" as local function calls as depicted in the pseudocode below corresponding to the model of FIG. 3.

```
void model_step( )
{
  A( );
  B( );
}
void A( )
{
  u3 = x;
  u2 = 2*u1;
  x = u2;
}
void B( )
{
  v3 = y;
  v2 = 3*v1;
  y = v2;
}
```

The task of an event may be specified as the name of a model task object, corresponding to a task in the real-time implementation. Simulink™ task objects correspond to spawned operating system tasks. Properties of a Task object may include a designated rate (periodic value, or asynchronous), priority, task stack size, whether the task is preemptible, or other properties. When an event is posted whose task is different from the task of the block or model construct posting the event, the function corresponding to the event is scheduled in the event's task. If the task is specified to be periodic, the function executes during any timestep of that task during which the event is posted. If the task is specified as asynchronous, then the posting of the event causes the task to be executed by the operating system.

Figure 6A:
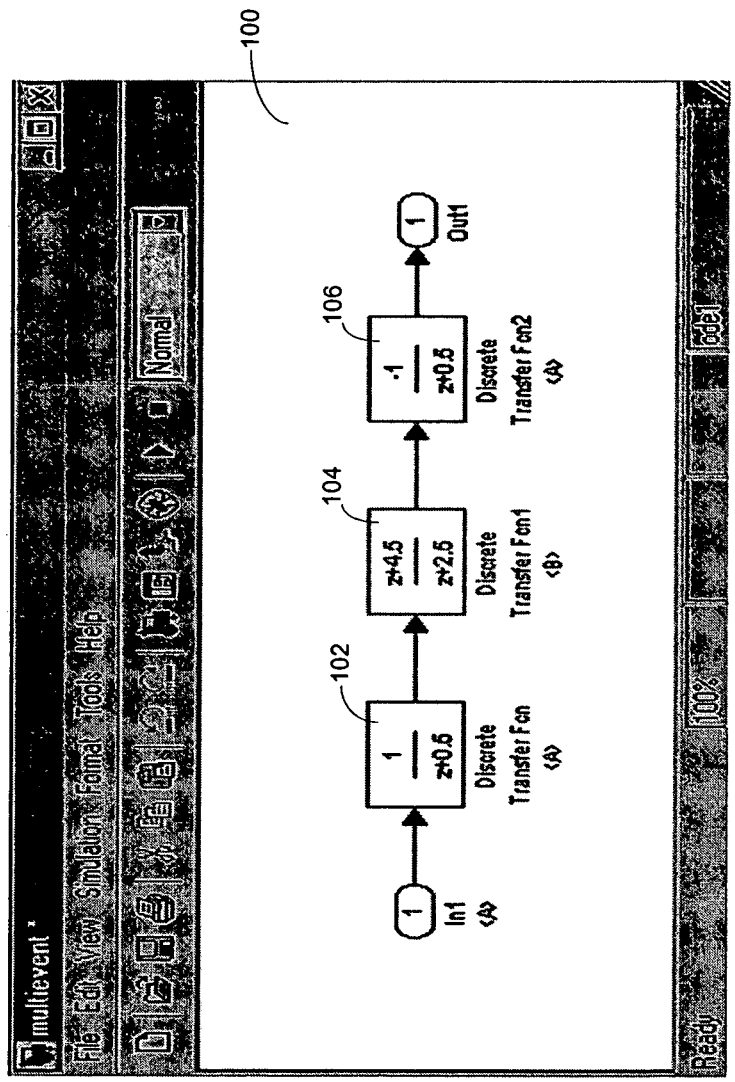
FIG. 6A depicts a model with event transitions occurring within the same task and without event transition blocks.
Figure 6B:
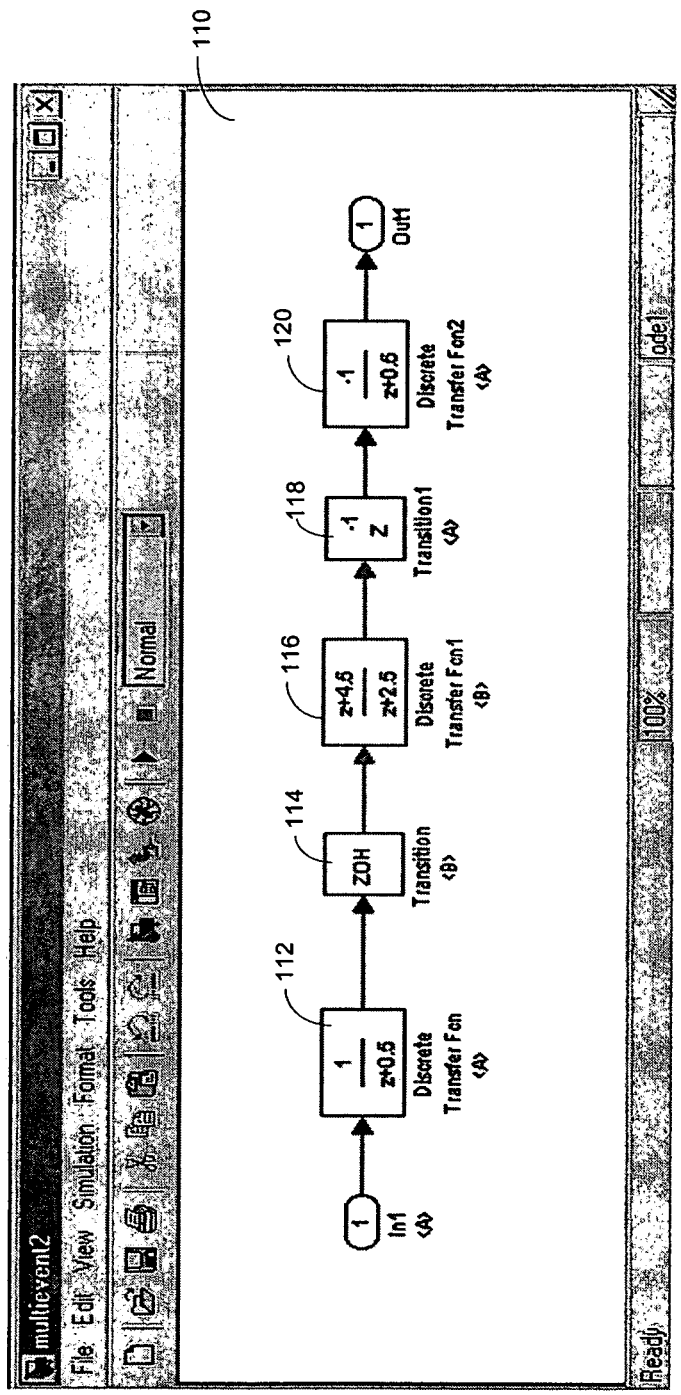
FIG. 6B depicts a model with event transitions occurring in different tasks using event transition blocks.
Figure 6C:
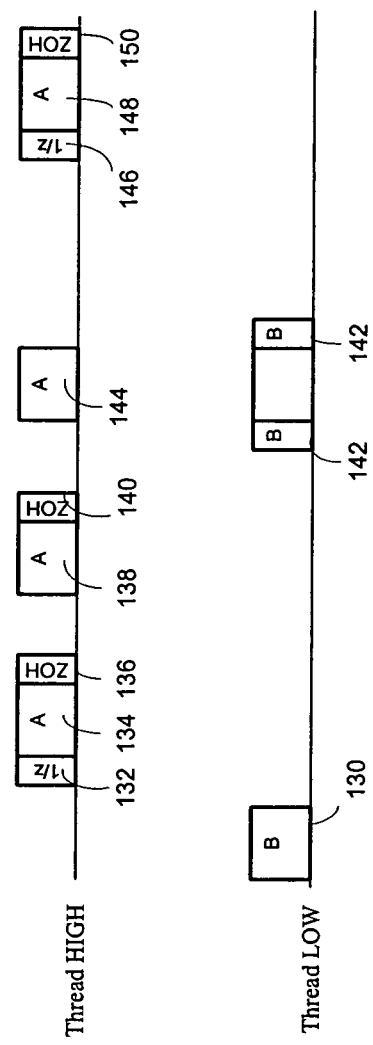
FIG. 6C is a timeline of the use of event transition blocks in a model.

The illustrative embodiment of the present invention avoids the asynchronous posting of events and multithreaded implementation, through the use of tasks. Tasks are used to help insure data integrity when using events in a real-time implementation by indicating where an event transition block is required for the sake of data integrity. Tasks are also used to specify the relative priority of the tasks associated with a transition. The illustrative embodiment of the present invention uses an event transition block that is a generalization of Simulink™'s rate transition block. FIGS. 6A, 6B and 6C illustrate some of the issues involved with event transitions and the usage of event transition blocks.

FIG. 6A depicts a model 100 with transitions occurring in response to the occurrence of Event A and Event B. In the model 100, the events A and B have the same task and the data integrity issue may be resolved by utilizing persistent memory to store data at the boundaries between the two events. Since both events are in the same task, they cannot preempt each other, and no additional mechanisms (e.g. double buffering) are necessary. In this model 100, persistent memory is utilized for the outputs of the left two transfer function blocks 102, 104 and transition blocks are not necessary to transfer data between the transfer function blocks 102, 104 and 106.

However, if Events A and B are specified to execute in different tasks, event transition blocks are necessary, as shown in FIG. 6B. In the model 110 of FIG. 6B, Event A has a task with high priority, while Event B has a task of low priority. In this case, the block named Transition 114, which lies at the boundary between the first 112 and second 116 transfer function blocks, acts as a zero-order hold. The block named Transition1 118, which lies at the boundary between the second 116 and third 120 transfer function blocks, acts as a delay by default.

The timeline of FIG. 6C shows the functionality of the event transition blocks of FIG. 6B. Since the event transition block Transition 114 acts as a Zero Order Hold, it is represented in the figure by time slices labeled "ZOH". Since the event transition block Transition1 118 acts as a delay, it is represented in the figure by time slices labeled "1/z". The event transition block Transition 114 executes each time the handler for Event A executes, as long as the task assigned to event A is not preempting the task containing Event B. This prevents the input to the handler for B from changing in the middle of its execution. This is necessary since in an asynchronous, causal system, there is no way of knowing in advance when event B will next be posted. The output function for the event transition block Transition1 118 executes each time Event A is posted after the handler for Event B has completed execution. This ensures that the handler for Event A utilizes the latest value computed by the handler for B, but doesn't execute the output function of Transition1 if it is unnecessary.

Thus, in FIG. 6C, the low priority task associated with Event B executes (step 130), a delay executes (step 132), the high priority task associated with Event A (step 134) executes and is followed by the Zero Order Hold (step 136). The task associated with Event A then executes (step 138) without being preceded by the delay since B hasn't executed since the last time A executed. The Zero Order Hold (step 140) is then executed following the high priority task (step 138). The low priority task associated with B (step 142) then executes and is interrupted by the high priority task (step 144). Following the completion of the high priority task (step 144) the low priority task (step 142) resumes without the Zero Order Hold being executed since the low priority task had already started. The process then continues with the delay (step 146), the high priority task (step 148) and the Zero Order Hold (step 150) being executed in order.

In addition to ensuring data integrity, event transition blocks may be necessary for resolution during event propagation. However, when transitioning between events that are in the same task, the block copies its input value to its persistent output. Post-compiling may then be attempted to reduce the block. It should be noted that transition blocks require an InitialCondition parameter to initialize their memory. In one implementation, the default value of this parameter is zero.

Events may also be used to handle errors encountered as a model executes. When an error occurs, the model may "post an event exceptionally". An event that is posted exceptionally is called an "exception event". A key characteristic of an exception event is that it is handled differently from an event that is posted non-exceptionally, or a "normal event". In particular, when one event posts another exception event, that first event's function never resumes execution upon exiting the function for the exception event. In other words, if B interrupts A exceptionally, the execution of A is not resumed after the completion of B. Note that an event may be called both normally and exceptionally in the same model.

Figure 7A:
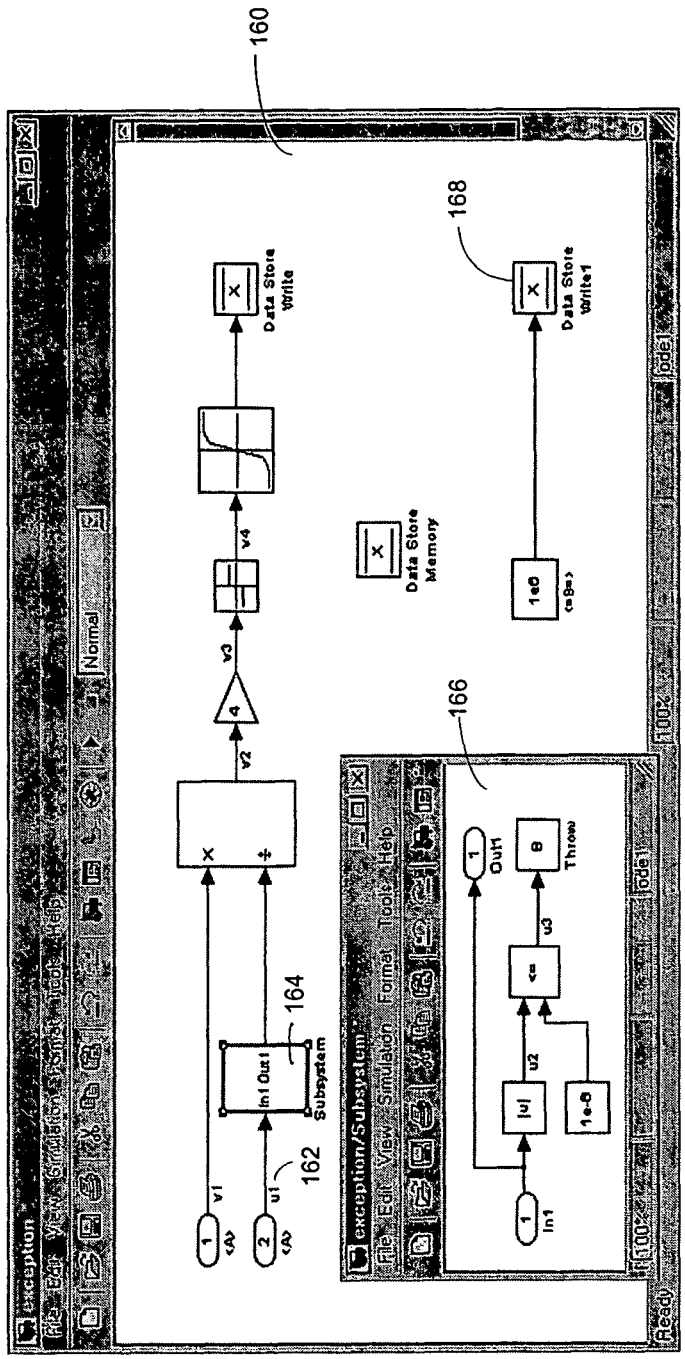
FIG. 7A depicts a model utilizing the illustrative embodiment of the present invention to handle events as exceptions.

The usage of an exception event in a model is depicted in FIG. 7A. In the model 160, the upper component is part of the handler for Event A. If the magnitude of the input u1 162 is less than or equal to 1e-6, Event B is posted exceptionally, or "thrown" for short, by the Throw block 166 in the exception subsystem 164. The exception subsystem 164 evaluates the input 162 and only throws event B if the input u1 162 is less than or equal to 1e-6. The Throw block 166 is similar in functionality to the Post block except that it posts an event exceptionally rather than normally. When Event B is thrown, the handler for Event B executes, setting a data store 168 to a large, fixed constant. When the handler for Event B finishes, control does not return to the handler for Event A, since Event B was thrown as an exception, but rather returns to the calling process. Code representative of the process depicted in FIG. 7A may be represented as follows:

```
void model_step( )
{
  A( );
}
void A( )
{
  u2 = fabs(u1);
  u3 = u2 <= 1.0e-6;
  if (fabs(u1) <= 1.0e-6) {
     B( ); /* return from B( ) exceptionally */
     return;
  }
  v4 = rt_sgn(4*(v1 / u1));
  x = rt_lookup(rtP.lookup, v4);
}
void B( )
{
  x = 1.0e6;
}
```

If Event B had been posted normally instead of as an exception, when the handler for Event B was finished, the handler for Event A would have completed execution. These two contrasting scenarios are depicted abstractly in FIG. 8. It will be understood by those skilled in the art that it is important to have a precise mechanism for controlling how blocks are sorted when introducing events into a model, since events introduce a causal relationship above and beyond the causal relationships implied by data dependency.

The model in FIG. 7A utilized an atomic subsystem to enforce a sorted block order in which the Throw block executes prior to the product block that it is intended to conditionally circumvent via the exception event B. Because the atomic subsystem is earlier than the product block in the sorted block list, its contents, including the Throw block, will execute prior to the product block. One drawback of an atomic subsystem is that its contents are not rendered at the same graphical level as its parent graph, making its contents less easily discernible.

Figure 7B:
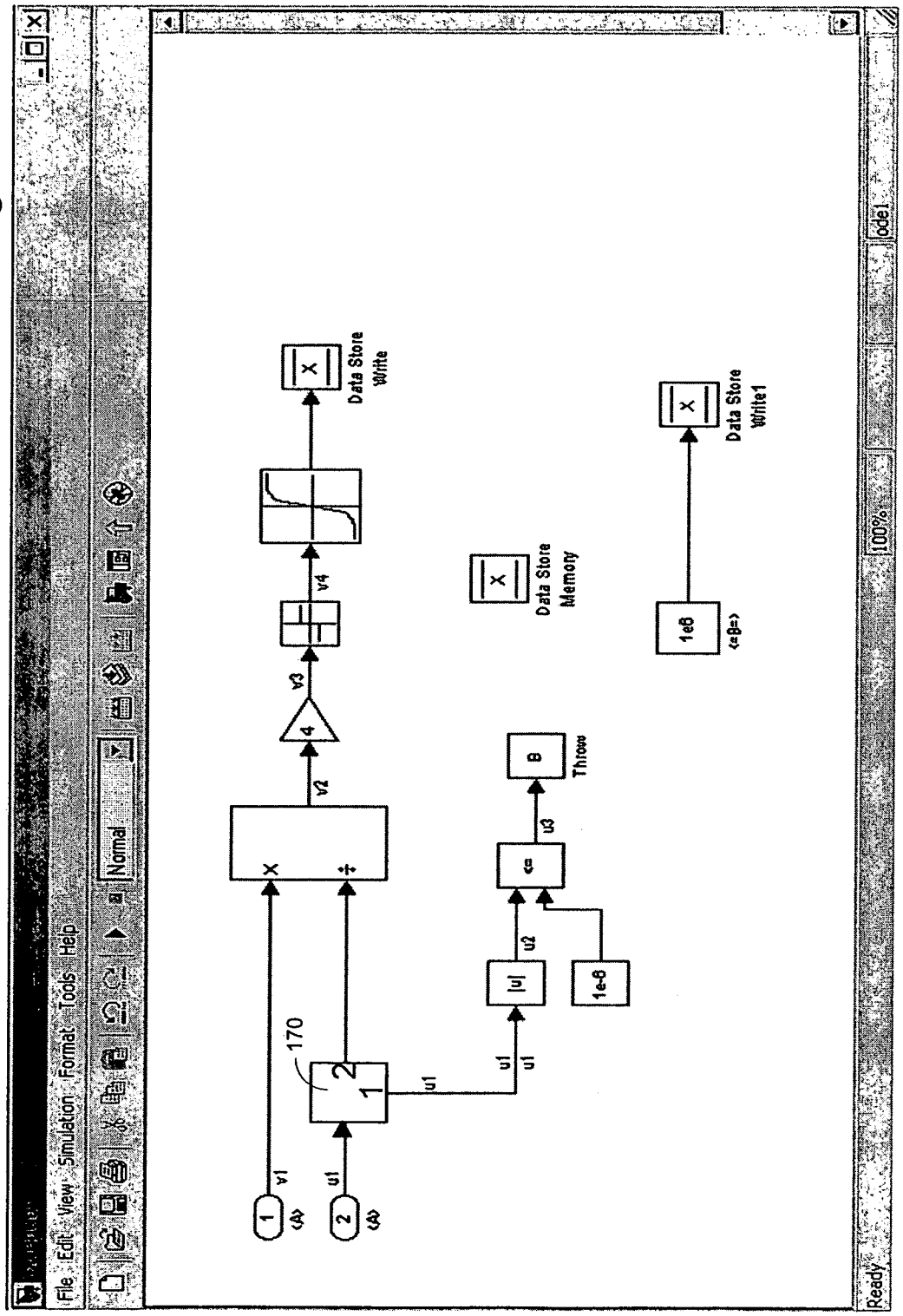
FIG. 7B depicts a model utilizing the illustrative embodiment of the present invention to control execution order using a branch priority block.
Figure 7C:
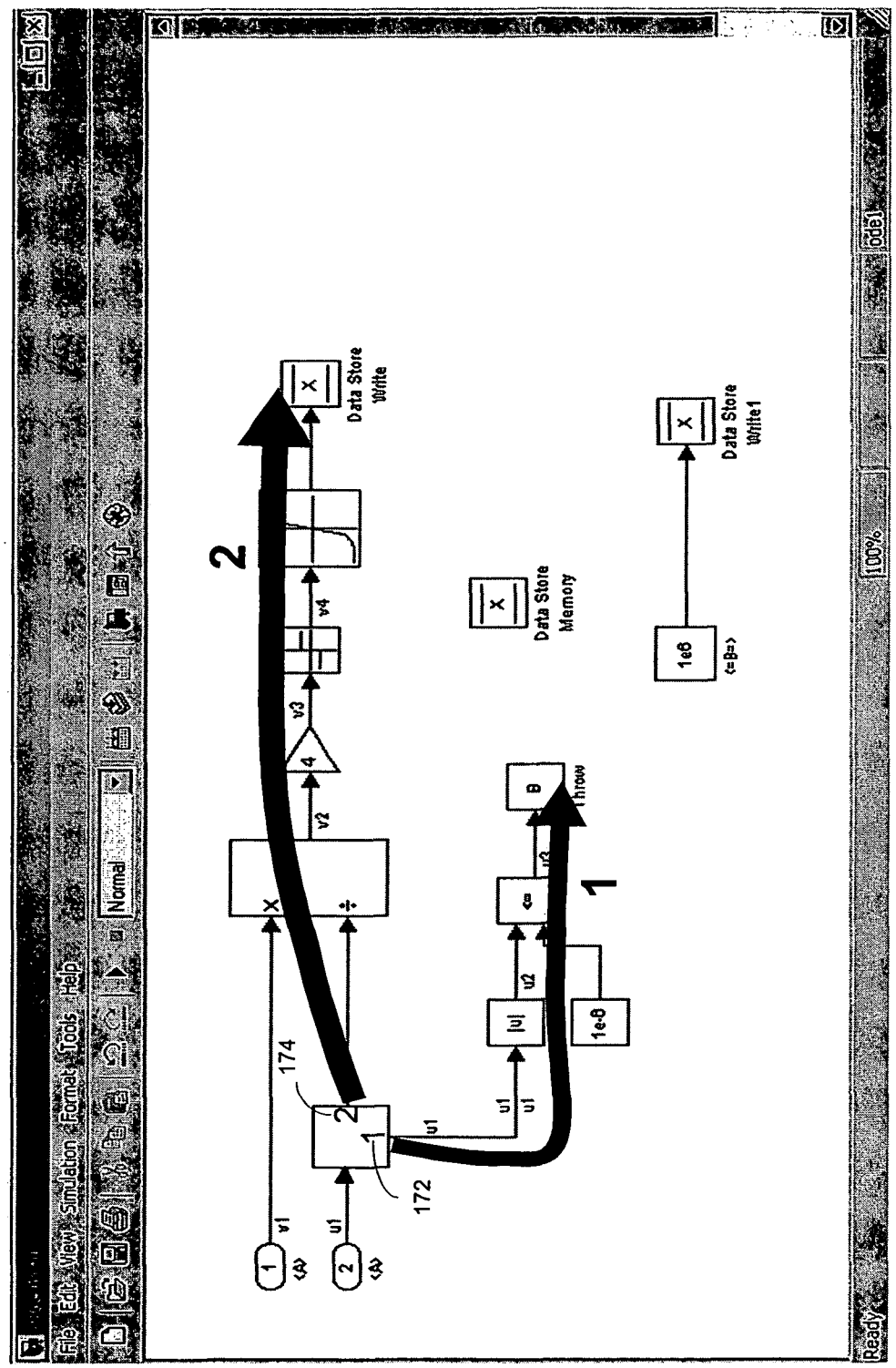
FIG. 7C highlight the execution order dictated by the branch priority block in the model of FIG. 7B

An alternative mechanism to the use of an atomic subsystem for controlling execution order is to assign the priority of branches leaving a block, and then all blocks in a branch inherit the priority of that branch when such inheritance is unique and unambiguous. FIG. 7B shows the placement of a "Branch Priority Block" 170 that specifies that blocks in the lower branch should execute prior to blocks in the upper branch. FIG. 7C indicates the execution order dictated by the Branch Priority Block 170 of FIG. 7B. The number "1" (172) in the Branch Priority Block 170 indicates that the lower branches should execute first. The number "2" in the Branch Priority Block 170 indicates that the upper branch should execute second.

Figure 7D:
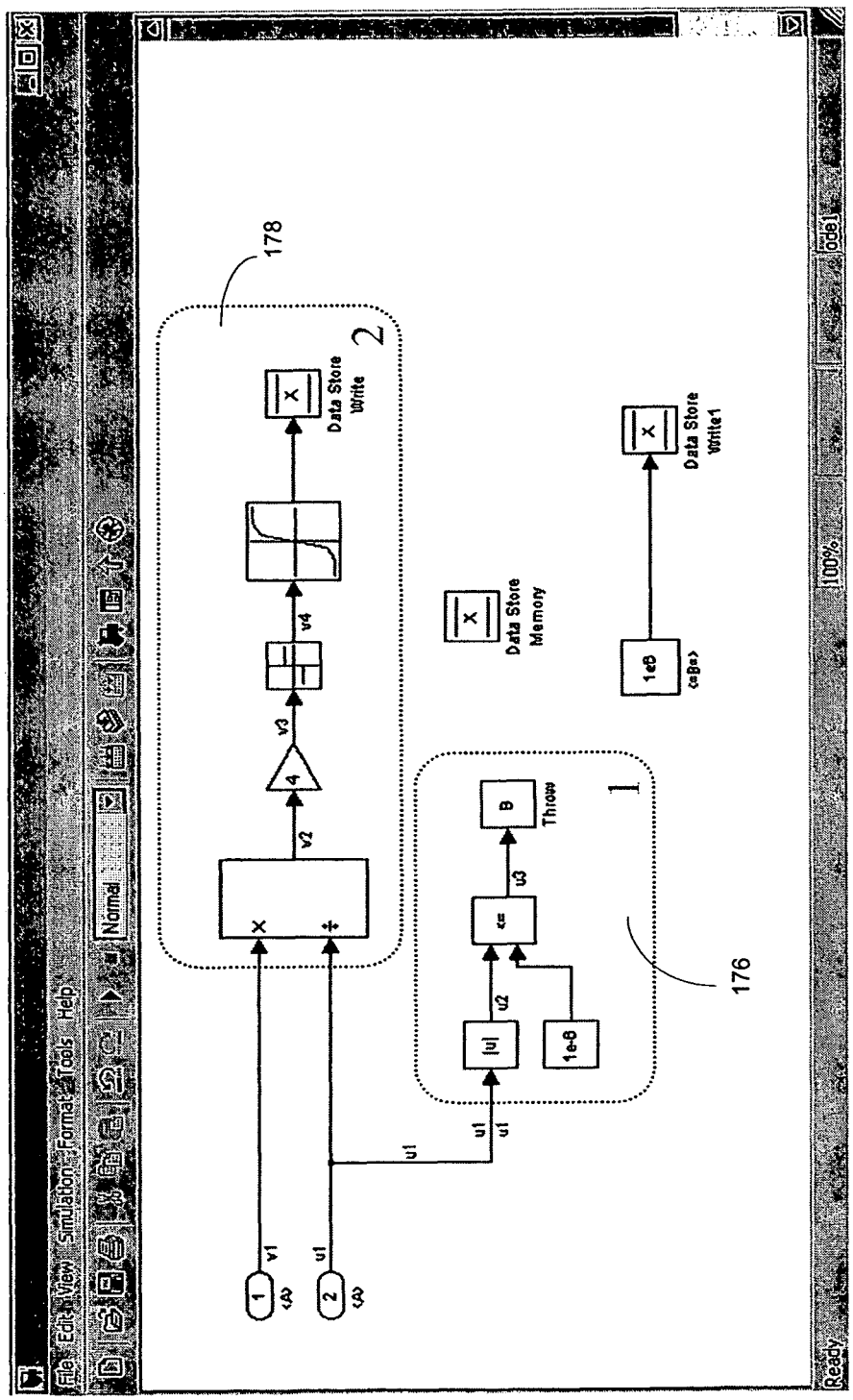
FIG. 7D depicts a model utilizing the illustrative embodiment of the present invention to control execution order with block groups.

An additional alternative to the use of an atomic subsystem for controlling execution order is depicted in FIG. 7D. FIG. 7D depicts the use of "block groups". The blocks in Group 1 (176) will appear before the blocks in Group 2 (178) in the sorted block list.

Figure 8:
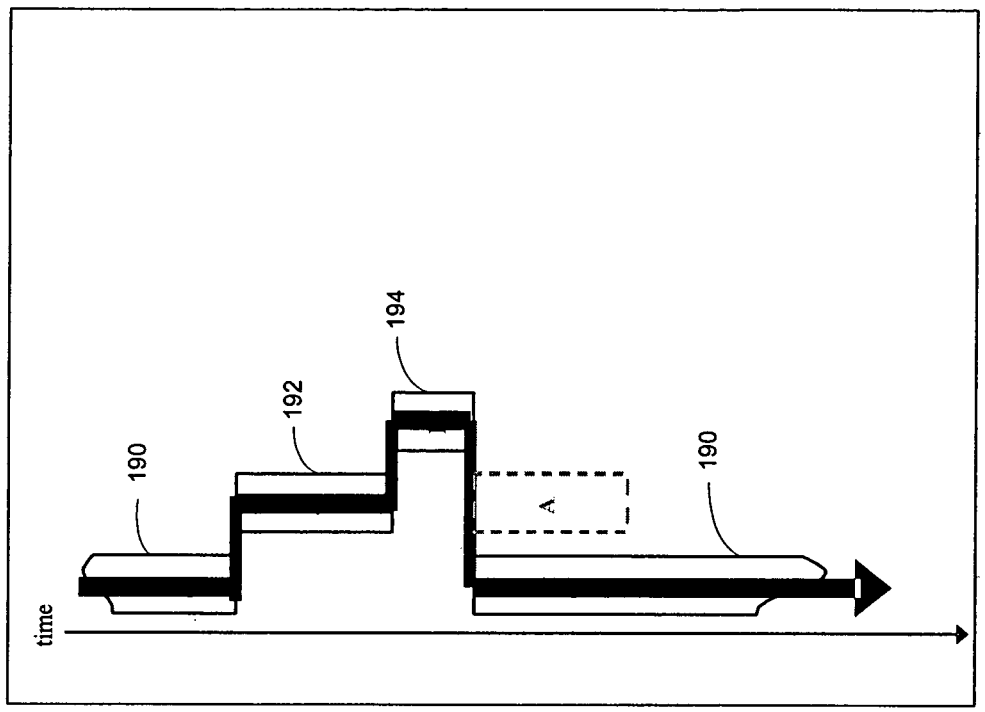
FIG. 8 is a data flow diagram contrasting the handling of normal and exceptional events in the illustrative embodiment of the present invention.
Figure 8:
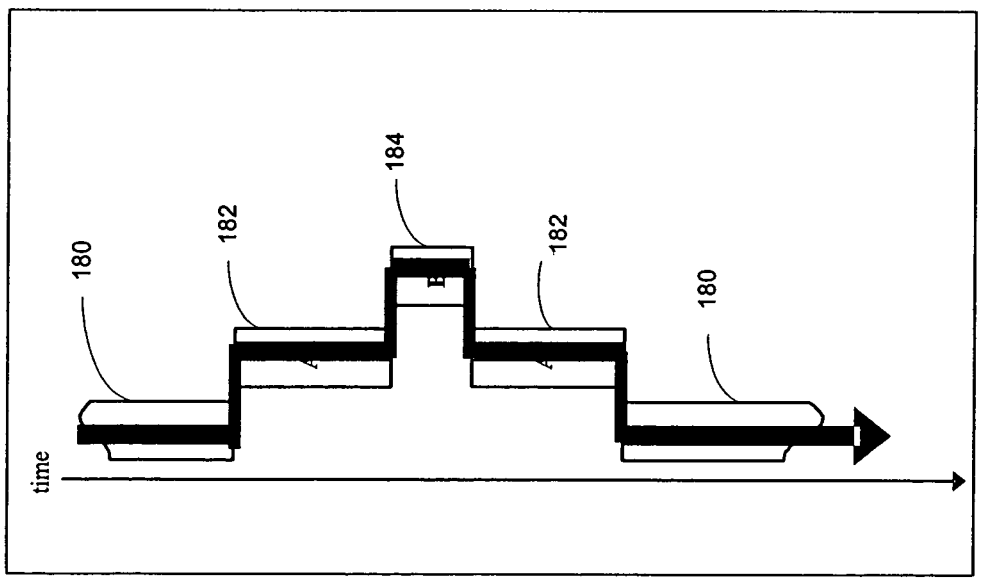

In the diagram on the left in FIG. 8 showing a normal posting process for two events, the execution of a model (step 180) triggers Event A (step 182). During the execution of Event A, Event B occurs normally and is handled (step 184). Following the handling of Event B (step 184), the handling of Event A (step 182) is resumed. Following the completion of the execution of Event A (step 182) control is returned to the point in model execution prior to the occurrence of Event A (step 180).

In the diagram on the right in FIG. 8 showing an exception posting process for two events, the execution of a model (step 190) triggers Event A (step 192). During the execution of Event A (step 192), Event B occurs exceptionally and is handled (step 194). Because Event B was handled exceptionally, control passes back to the point in model execution that existed prior to the occurrence of Event A (step 190) without the handling of Event A resuming.

The "early return" associated with an exception event can also help prevent computations downstream from a signal involved in an error condition from uselessly executing. For example, in the example of FIG. 7, the check for the magnitude of u1 occurs as part of the atomic subsystem executing before the product block and blocks downstream from the product block. Because of the early return from the interrupted event, those blocks are spared from (useless) execution if Event B is thrown.

As discussed above, an event may be posted normally or exceptionally. The Post block is used to post an event normally, while the Throw block is used to post an event exceptionally. In addition, a user-specified S-Function API can be used to post an event normally or exceptionally. A model component may handle the event when it is thrown normally, or when it is thrown exceptionally, but not both cases. A block's sample time may be specified as 'A' to indicate that it handles Event A when posted normally, or 'A.exception' to indicate that it handles Event A when posted exceptionally. A block with sample time A does not handle Event A when it is posted exceptionally, and a block with sample time A.exception does not handle Event A when it is posted normally.

Explicit events posted exceptionally should have a non-empty handler; there should be at least one block in the model handling the event exceptionally. If this is not the case, an error is raised. This requirement is justified by the recognition that an explicit exception event is posted by the model components the user has taken the time to create, and that such an event should be handled by the model. Implicit events are posted normally if there is a nonempty handler. If no model component is handling the implicit event posted normally, the event is posted exceptionally instead. A Throw block may repost an event that it is handling normally as an exception event. This scenario may be utilized when success handling the event normally is not guaranteed. Following an initial attempt, the event may be handled exceptionally.

Figure 9:
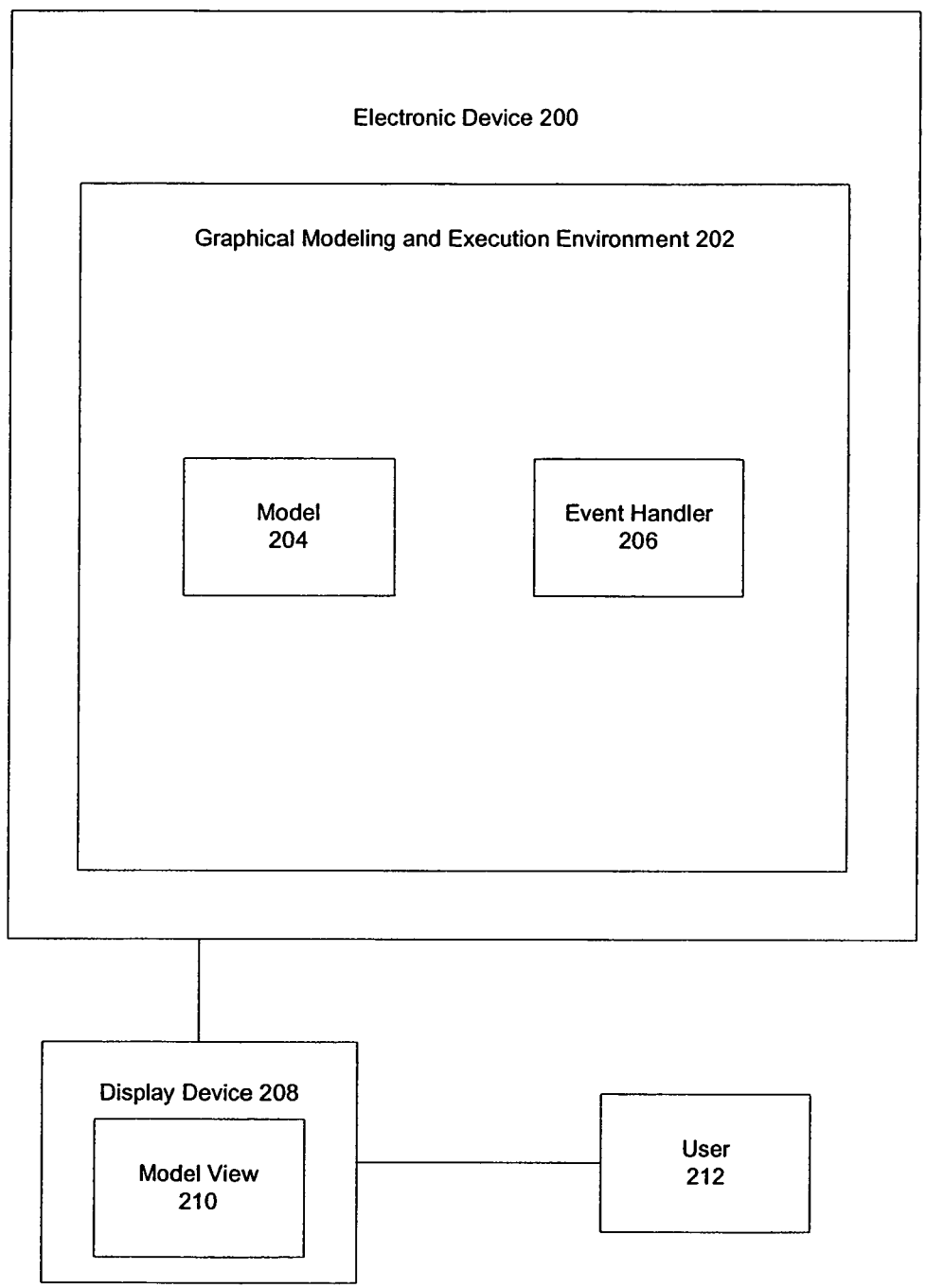
FIG. 9 depicts an environment suitable for practicing the illustrative embodiment of the present invention.

FIG. 9 depicts an environment suitable for practicing the illustrative embodiment of the present invention. An electronic device 200 holds a graphical modeling and execution environment 202 such as the Simulink™ or Stateflow™ applications. The electronic device 200 may be a workstation or server, laptop, PDA, network attached appliance, or some other digital electronic device capable of supporting the graphical modeling and execution environment 202. The graphical modeling and execution environment 202 include at least one graphical model 204 and an event handler 206 as discussed above. The electronic device 200 is interfaced with a display device 208 which displays a view 210 of the model 204 for a user 212. The display device 208 and user 212 may be located locally or remotely to the electronic device 200. Those skilled in the art will recognize there are many different possible software and hardware configurations within the scope of the present invention.

Figure 10:
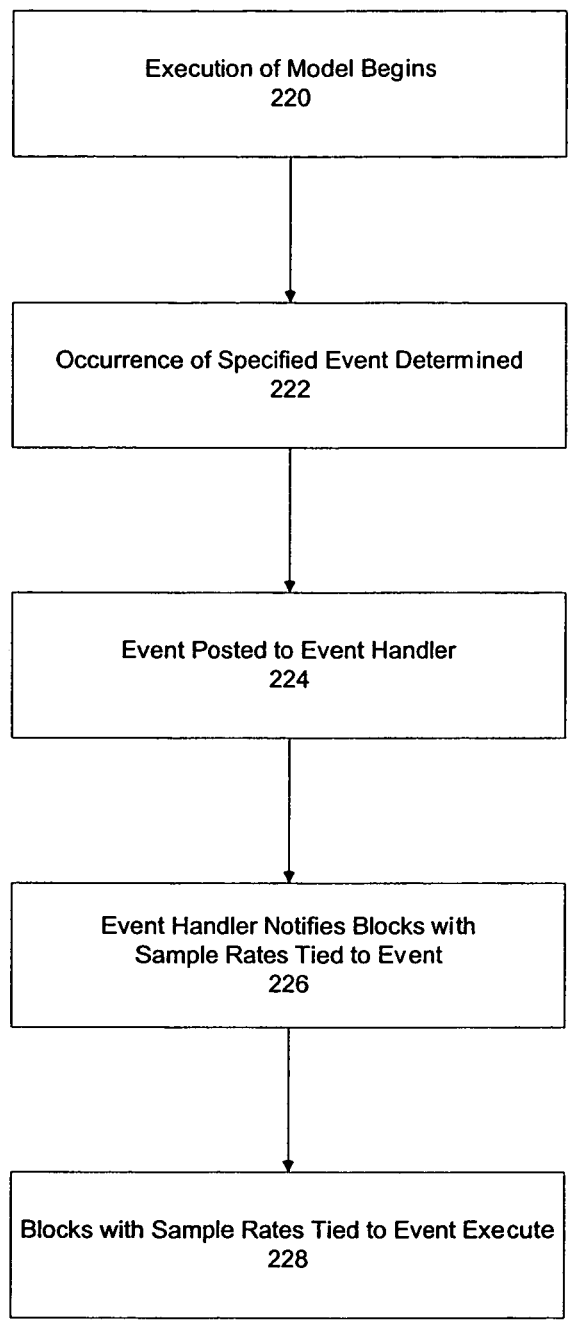
FIG. 10 is a flowchart of a high level view of the sequence of steps followed by the illustrative embodiment of the present invention to associate sample rates with event occurrence.

One high level sequence of steps followed by the illustrative embodiment of the present invention is shown in FIG. 10. The sequence begins with the execution of the model 204 in the graphical modeling and execution environment 202 (step 220). The occurrence of a previously specified event during the execution of the model is then determined (step 222). The event occurrence is posted to the event handler 206 (step 224). The event handler notifies the registered blocks whose sample rates are tied to the occurrence of the event (step 226). Following notification, the blocks whose sample rates are tied to the event occurrence execute (step 228).

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequences of steps discussed herein are examples and not the exclusive sequence of steps possible within the scope of the present invention.

We claim:

1. A method for controlling model execution in a graphical modeling environment, said method comprising:
   displaying a view of an executable graphical model with a plurality of executable time-based components, said executable graphical model including at least one user-configurable, executable graphical post component having at least one input port for receiving at least one input signal, said at least one user-configurable, executable graphical post component being configured to post an event when a condition associated with said at least one input signal of said at least one user-configurable, executable graphical post component is satisfied;
   logically associating at least one executable time-based component with said event;
   identifying when said condition is satisfied during execution of said executable graphical model;
   posting, using said at least one user-configurable, executable graphical post component, said event by informing an event handler of an occurrence of said event in said graphical modeling environment;
   notifying said at least one executable time-based component that is logically associated with said event of said occurrence of said event, said occurrence of said event triggering an execution of said at least one executable time-based component; and
   executing, within said graphical modeling environment, during a simulation of said executable graphical model, said at least one executable time-based component in response to said notifying as opposed to in response to a specific point in time.

2. The method of claim 1, further comprising:
   registering said at least one executable time-based component with said event handler.

3. The method of claim 2, further comprising:
   indicating which event an executable time-based component receives with a user-configurable color in said view.

4. The method of claim 1 wherein said at least one user-configurable, executable graphical post component is a block or label.

5. The method of claim 1, further comprising:
   setting a sample time for an initial execution of a first executable time-based component to be said occurrence of said event.

6. The method of claim 5, further comprising:
   propagating said sample time to a second executable time-based component in said executable graphical model, said second executable time-based component configured to inherit a sample rate.

7. The method of claim 5, further comprising:
   setting a sample time of a plurality of non-contiguous executable time-based components in said executable graphical model to be said occurrence of said event.

8. The method of claim 7 wherein said sample time for said plurality of non-contiguous executable time-based components is set without adjusting visible connections between said plurality of executable time-based components displayed in said view.

9. The method of claim 5, further comprising:
   indicating with an event ID in said view that said sample time of said first executable time-based component is set to said event.

10. The method of claim 5 wherein said event is an explicit event set by a user.

11. The method of claim 5 wherein said event is an implicit event caused by said execution of said executable graphical model.

12. The method of claim 11 wherein said implicit event is one of power-up, power-down and initialization.

13. The method of claim 11 wherein said implicit event corresponds to one of enabling and disabling of a subsystem.

14. The method of claim 1, wherein an execution scope of said event for which said execution of said executable graphical model is being monitored is restricted to a portion of said executable graphical model.

15. The method of claim 1 wherein each event in said executable graphical model maps on a one-to-one basis to an event handler, said event handler being a function.

16. The method of claim 15 wherein said function is inlined.

17. The method of claim 1 wherein a branch priority executable time-based component indicates an order of execution among at least two branches of executable time-based components in response to said notifying.

18. The method of claim 17 wherein more than one executable time-based component group executes in response to said notifying, said executable time-based component groups being a user selected grouping of executable time-based components, said order of execution of said executable time-based component groups specified by a user.

19. A method for controlling model execution in a graphical modeling environment, said method comprising:
   displaying a view of an executable model with a plurality of executable time-based components, said model including at least one user-configurable, executable graphical post component having at least one input port for receiving at least one input signal, said at least one user-configurable, graphical post component being configured to post a specified event when a condition associated with said at least one input signal of said at least one user-configurable, executable graphical post component is satisfied;
   identifying when said condition is satisfied during execution of said executable model, said execution of said executable model including running a simulation of said executable model within said graphical modeling environment;

posting, using said at least one user-configurable, executable graphical post component, said specified event by informing an event handler of an occurrence of said specified event in said graphical modeling environment;
interrupting execution of an executing event in response to said posting of said specified event; and
performing an operation in said executable model within said graphical modeling environment in response to said posting of said specified event.

20. The method of claim 19 wherein said specified event is treated as a normal event and further comprising:
resuming execution of said interrupted event.

21. The method of claim 19 wherein said specified event is treated as an exception event and further comprising:
returning control of said execution of said model to a calling process which called said interrupted executing event without resuming execution of said interrupted event.

22. The method of claim 19 wherein said specified event is specified using an instantiated event object.

23. The method of claim 22 wherein said specified event is an explicit event.

24. The method of claim 22 wherein said specified event is an implicit event.

25. The method of claim 22 wherein said event object is associated with a task object, said task object corresponding to an operating system task.

26. The method of claim 25 wherein said task object has at least one of a specified execution rate and priority.

27. The method of claim 26 wherein at least two events with different tasks are executing in a model and further comprising:
using event transition components to schedule said execution of time-based components associated with said at least two events, said event transition components separating said execution of said time-based components associated with said at least two events.

28. The method of claim 19 wherein said operation is controlled by an order of execution indicated in a branch priority block.

29. The method of claim 19 wherein said operation is said execution of more than one executable time-based component groups, said executable time-based component groups being a user selected grouping of executable time-based components, said order of execution of said executable time-based component groups specified by a user.

30. A physical non-transitory computer-readable medium holding computer-executable instructions for controlling model execution in a graphical modeling environment, said instructions comprising:
one or more instructions for displaying a view of an executable graphical model with a plurality of executable time-based components, said executable graphical model including at least one user-configurable, executable graphical post component having at least one input port for receiving at least one input signal, said at least one user-configurable, executable graphical post component being configured to post an event when a condition associated with said at least one input signal of said at least one user-configurable, executable graphical post component is satisfied;
one or more instructions for logically associating at least one executable time-based component with said event;
one or more instructions for identifying when said condition is satisfied during execution of said executable graphical model;
one or more instructions for posting, using said at least one user-configurable, executable graphical post component, said event by informing an event handler of an occurrence of said event in said graphical modeling environment;
one or more instructions for notifying said at least one executable time-based component that is logically associated with said event of said occurrence of said event, said occurrence of said event triggering an execution of said at least one executable time-based component; and
one or more instructions for executing, within said graphical modeling environment, during a simulation of said executable graphical model, said at least one executable time-based component in response to said notifying as opposed to in response to a specific point in time.

31. The non-transitory computer-readable medium of claim 30, wherein said instructions further comprise:
one or more instructions for registering said at least one executable time-based component with said event handler.

32. The non-transitory computer-readable medium of claim 31, wherein said instructions further comprise:
one or more instructions for indicating which event an executable time-based component receives with a user-configurable color in said view.

33. The non-transitory computer-readable medium of claim 30, wherein said at least one user-configurable, executable graphical post component is a block or label.

34. The non-transitory computer-readable medium of claim 30, wherein said instructions further comprise:
one or more instructions for setting a sample time for an initial execution of a first executable time-based component to be said occurrence of said event.

35. The non-transitory computer-readable medium of claim 34, wherein said instructions further comprise:
one or more instructions for propagating said sample time to a second executable time-based component in said executable graphical model, said second executable time-based component configured to inherit a sample rate.

36. The non-transitory computer-readable medium of claim 34, wherein said instructions further comprise:
one or more instructions for setting a sample time of a plurality of non-contiguous executable time-based components in said executable graphical model to be said occurrence of said event.

37. The non-transitory computer-readable medium of claim 36 wherein said sample time for said plurality of non-contiguous executable time-based components is set without adjusting visible connections between executable time-based components displayed in said view.

38. The non-transitory computer-readable medium of claim 34, wherein said instructions further comprise:
one or more instructions for indicating with an event ID in said view that said sample time of said first executable time-based component is set to said event.

39. The non-transitory computer-readable medium of claim 34 wherein said event is an explicit event set by a user.

40. The non-transitory computer-readable medium of claim 34 wherein said event is an implicit event caused by said execution of said executable graphical model.

41. The non-transitory computer-readable medium of claim 40 wherein said implicit event is one of power-up, power-down and initialization.

42. The non-transitory computer-readable medium of claim 40 wherein said implicit event corresponds to one of said enabling and disabling of a subsystem.

43. The non-transitory computer-readable medium of claim 30, wherein an execution scope of said event for which said execution of said executable graphical model is being monitored is restricted to a portion of said executable graphical model.

44. The non-transitory computer-readable medium of claim 30 wherein each event in said executable graphical model maps on a one-to-one basis to an event handler, said event handler being a function.

45. The non-transitory computer-readable medium of claim 44 wherein said function is inlined.

46. The non-transitory computer-readable medium of claim 30 wherein a branch priority block indicates an order of execution among at least two branches of executable time-based components in response to said notifying.

47. The non-transitory computer-readable medium of claim 46 wherein more than one executable time-based component groups execute in response to said notifying, said executable time-based component groups being a user selected grouping of the executable time-based components, said order of execution of said executable time-based component groups specified by a user.

48. A physical non-transitory computer-readable medium holding computer-executable instructions for controlling model execution, said instructions comprising:
  one or more instructions for displaying a view of an executable model with a plurality of executable time-based components, said model including at least one user-configurable, executable graphical post component having at least one input port for receiving at least one input signal, said at least one user-configurable, executable graphical post component being configured to post a specified event when a condition associated with said at least one input signal of said at least one user-configurable, executable graphical post component is satisfied;
  one or more instructions for identifying said satisfaction of said condition during execution of said executable model, said execution of said executable model including running a simulation of said executable model within a graphical modeling environment;
  one or more instructions for posting, using said executable graphical post component, said specified event by informing an event handler of an occurrence of said specified event in said graphical modeling environment;
  one or more instructions for interrupting execution of an executing event in response to said posting of said specified event; and
  one or more instructions for performing an operation in said executable model within said graphical modeling environment in response to said posting of said specified event.

49. The non-transitory computer-readable medium of claim 48 wherein said specified event is treated as a normal event and wherein said instructions further comprise:
  one or more instructions for resuming execution of said interrupted event.

50. The non-transitory computer-readable medium of claim 48 wherein said specified event is treated as an exception event and wherein said instructions further comprise:
  one or more instructions for returning control of said execution of said executable model to a calling process which called said interrupted event without resuming execution of said interrupted event.

51. The non-transitory computer-readable medium of claim 48 wherein said specified event is specified using an instantiated event object.

52. The non-transitory computer-readable medium of claim 51 wherein said specified event is an explicit event.

53. The non-transitory computer-readable medium of claim 51 wherein said specified event is an implicit event.

54. The non-transitory computer-readable medium of claim 51 wherein said event object is associated with a task object, said task object corresponding to an operating system task.

55. The non-transitory computer-readable medium of claim 54 wherein said task object has at least one of a specified execution rate and priority.

56. The non-transitory computer-readable medium of claim 55 wherein at least two events with different tasks are executing in a model and wherein said instructions further comprise:
  one or more instructions for using event transition components to schedule said execution of executable time-based components associated with said at least two events, said event transition components separating said execution of said executable time-based components associated with said at least two events.

57. The non-transitory computer-readable medium of claim 48 wherein said operation is controlled by an order of execution indicated a branch priority block.

58. The non-transitory computer-readable medium of claim 57 wherein said operation is said execution of more than one executable time-based component groups, said executable time-based component groups being a user selected grouping of said executable time-based components, said order of execution of said executable time-based component groups specified by a user.

59. An apparatus comprising:
  a display; and
  a processor coupled to the display, the processor configured to:
    present on the display a view of an executable graphical model with a plurality of executable time-based components, said executable graphical model including a user-configurable, executable graphical post component having at least one input port for receiving at least one input signal, said user-configurable, executable graphical post component configured to post an event when a condition associated with said at least one input signal of said user-configurable, executable graphical post component is satisfied;
    logically associate at least one executable time-based component with said event;
    identify when said condition is satisfied during execution of said executable graphical model;
    post, using said user-configurable, executable graphical post component, said event by informing an event handler of an occurrence of said event in a graphical modeling environment;
    notify said at least one executable time-based component that is logically associated with said event of said occurrence of said event, said occurrence of said event triggering an execution of said at least one executable time-based component; and
    execute, within said graphical modeling environment, during a simulation of said executable graphical model, said at least one executable time-based component in response to said notifying as opposed to in response to a specific point in time.

60. The apparatus of claim 59 wherein the processor is further configured to:
  register said at least one executable time-based component with said event handler.

61. The apparatus of claim 60 wherein said processor is further configured to:

indicate which event an executable time-based component receives with a user-configurable color in said view.

62. The apparatus of claim 59 wherein said executable graphical post component is a block or label.

63. The apparatus of claim 59 wherein said processor is further configured to:

set a sample time for an initial execution of a first executable time-based component to be said occurrence of said event.

64. The apparatus of claim 63 wherein said processor is further configured to:

set a sample time of a plurality of non-contiguous executable time-based components in said executable graphical model to be said occurrence of said event.

65. The apparatus of claim 64 wherein said sample time for said plurality of non-contiguous executable time-based components is set without adjusting visible connections between said plurality of executable time-based components presented in said view.

66. The apparatus of claim 63 wherein said processor is further configured to:

indicate with an event ID in said view that said sample time of said first executable time-based component is set to said event.

67. The apparatus of claim 63 wherein said event is an explicit event set by a user.

68. The apparatus of claim 63 wherein said event is an implicit event caused by said execution of said executable graphical model.

69. The apparatus of claim 68 wherein said implicit event is one of power-up, power-down and initialization.

70. The apparatus of claim 68 wherein said implicit event corresponds to one of enabling and disabling of a subsystem.

71. The apparatus of claim 59 wherein an execution scope of said event for which said execution of said executable graphical model is being monitored is restricted to a portion of said executable graphical model.

72. The apparatus of claim 59 wherein each event in said executable graphical model maps on a one-to-one basis to an event handler, said event handler being a function.

73. The apparatus of claim 72 wherein said function is inlined.

74. The apparatus of claim 59 wherein a branch priority executable time-based component indicates an order of execution among at least two branches of executable time-based components in response to said notifying.

75. The apparatus of claim 74 wherein more that one executable time-based component group executes in response to said notifying, said executable time-based component groups being a user selected grouping of executable time-based components, said order of execution of said executable time-based component groups specified by a user.

* * * * *